Feb. 22, 1944. M. J. O. LOBELLE 2,342,351
TOWING OR SUSPENDING AND RELEASING DEVICE
Filed Aug. 12, 1943 2 Sheets-Sheet 1

Inventor
MJOLOBELLE
By
Ernst Howbert Hair
Attorney

Feb. 22, 1944.  M. J. O. LOBELLE  2,342,351
TOWING OR SUSPENDING AND RELEASING DEVICE
Filed Aug. 12, 1943    2 Sheets-Sheet 2

Inventor
M.J.O.Lobelle

Patented Feb. 22, 1944

2,342,351

UNITED STATES PATENT OFFICE 2,342,351

TOWING OR SUSPENDING AND RELEASING DEVICE

Marcel Jules Odilon Lobelle, Slough, England, assignor to Messrs. R. Malcolm Limited, Slough, England, a British company Application August 12, 1943, Serial No. 498,364
In Great Britain January 13, 1943

5 Claims. (Cl. 280—33.15)

This invention relates to towing or suspending and releasing devices such as are used on aeroplanes for towing gliders or suspending objects to be dropped, but devices of this character are also useful for towing land vehicles or for towing purposes at sea, so that the invention is not confined to any particular use of the apparatus. The device according to this invention is of the general type described in the specification of my United States patent application Serial No. 434,146, now Patent #2,333,621, issued November 2, 1943, and application Serial No. 459,198, now Patent #2,332,155, issued October 19, 1943, but it is designed to be used under a variety of other circumstances than those dealt with in those patent specifications.

The device according to this invention can be made comparatively small and light so as to occupy very little space or it can be enlarged up to any size according to the load it may have to carry. In the construction according to this invention the load is taken by a pivotally mounted claw having a nose engaging with a pivotally mounted trigger which is rocked when required for releasing the claw and is normally held in the engaging position by a toggle mechanism controlled by a suitable lever and linkage. The whole mechanism can be accommodated between a pair of side plates suitably mounted on a base or support of any kind, and a very light pull moving the controlling lever against the action of a spring will suffice to release the claw even when it is very heavily loaded.

It will be convenient to describe the invention with the device in a position to support a suspended load which may pull out towards the horizontal, but obviously the device can be mounted in any position either for towing or suspending purposes as may be required.

The invention is illustrated in the accompanying drawings in which—

Figure 1:
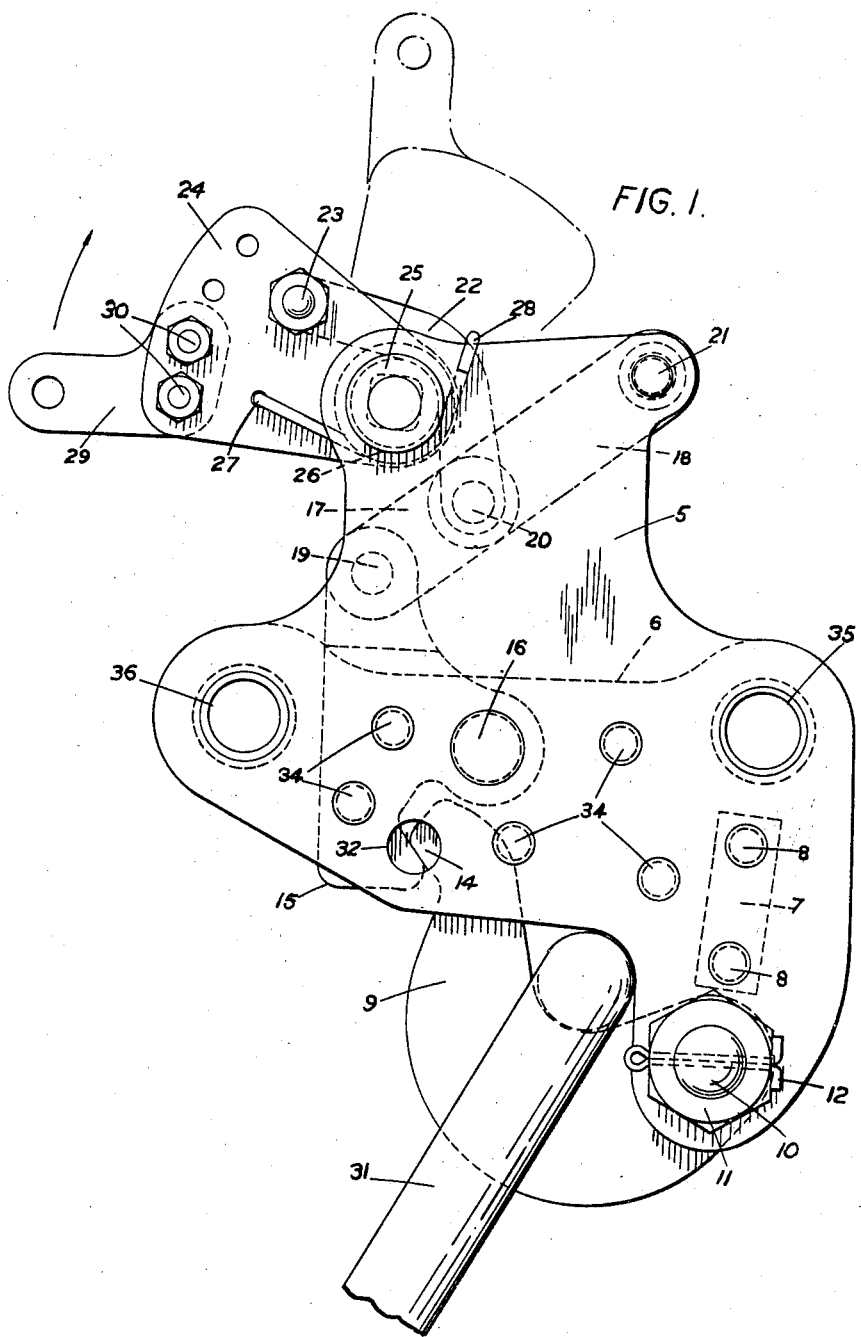
Figure 2:
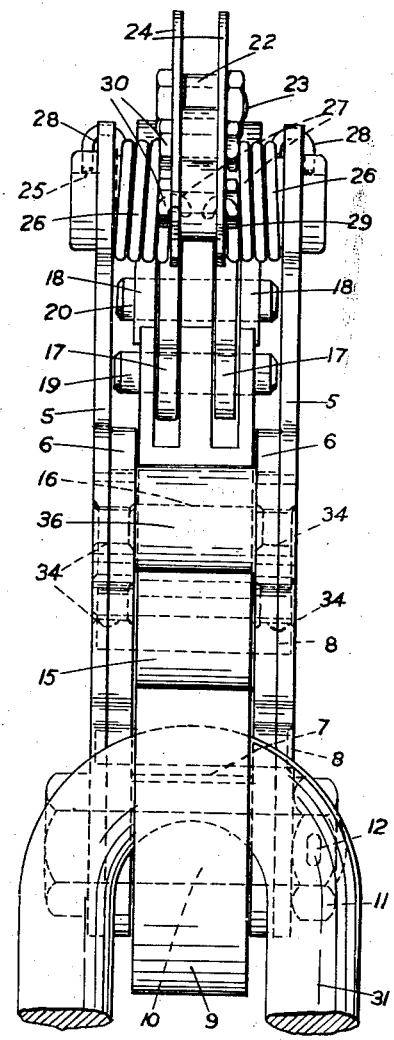
Figure 3:
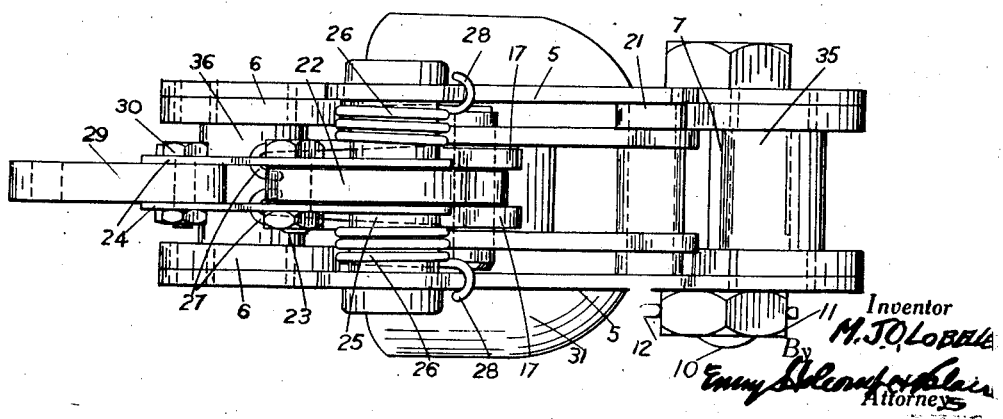

Figure 1 shows the device in side elevation;
Figure 2 shows it in end elevation, and
Figure 3 shows it in plan view.

In the drawings the mechanism is accommodated between two side plates 5 which are strengthened in the lower part by reinforcing plates 6 spaced apart toward the rear by a distance block 7 through which rivets 8 with flush heads are passed connecting the two reinforcing plates 6, and side plates 5. The claw 9 is mounted on a pin or bolt 10 which extends through the side plates 5 and reinforcing plates 6 and has one end threaded to receive a nut 11, secured by a split pin 12.

The distance piece 7 ensures that the side plates and reinforcement plates are kept at the proper distance apart to allow sufficient clearance for the claw 9 to work freely between them. The end 14 of the claw engages with a recess in the trigger 15 pivoted on the rivet 16 extending through the side plates and controlled by the toggle mechanism 17, 18 from above. The links 17 of the toggle mechanism are pivoted at 19 to the top of the trigger 15, and are connected by a pivot 20 to the links 18 forming the other part of the toggle. These links 18 are pivoted at 21 between the side plates 5. A cranked link 22 is connected to the pivot 20 between the links 17 and 18 and is connected at 23 to a pair of plates 24 forming a lever by which the toggle mechanism is controlled. The two plates 24 are preferably welded to their axis 25 which is a hollow stud shouldered at its ends where they bear in the side plates 5. On the stud 25 at each side of the plates 24 strong coiled springs 26 are mounted, one end of each spring as at 27 being bent to pass through a hole in one of the plates 24, while the other end 28 is bent to hook over the top of the side plates 5. The spring 26 thus act to draw down the lever 24 in a counterclockwise direction, as seen in Figure 1, with the cranked link 22 resting on the stud 25 and holding up the pivot 20 of the toggle mechanism. The two plates forming the lever 24 have a number of holes in them to which a lug 29 may be attached by bolts 30. The lug serves for the attachment of the end of a Bowden wire or other operating mechanism by which the lever 24 is pulled in the direction of the arrow, Figure 1, to release the toggle mechanism and the claw 9. When the lever 24 is turned in a clockwise direction the cranked link 22 depresses the pivot 20 between the links 17 and 18 and as the links 18 turn about their pivot 21 the links 17 cause the trigger 15 to turn in a clockwise direction about its pivot 16, until the nose of the trigger releases the end 14 of the claw 9, allowing this claw to fall away, and to release any member engaging with it such as a link or shackle 31, indicated in section in Figure 1.

The side plates 5 and the reinforcing plates 6 have a hole cut in them at 32, Figure 1, through which the end 14 of the claw 9 may normally be seen in engagement with the trigger so that the full engagement of these parts may be observed.

There are two devices which prevent unintentional disengagement of the trigger from the claw, namely, on the one hand the links 17 and 18 of the toggle mechanism, whose connecting pivot 20 is approximately in line between the centres of the pivot 19 on the trigger and the pivot 21 between the side plates, and on the other hand the cranked link 22 whose ends are connected to the pivot 20 and to the pivot 23 on the lever 24 respectively, this cranked link being normally in such a position that a radial line from the pivot 20 to the pivot 23 passes just over the centre of the stud 25 in reaching the position shown in Figure 1. Hence, even if the links 17, 18 of the toggle mechanism are arranged so that they do not move past the straight line position when the trigger engages with the claw, the cranked link 22 will restrict any tendency to unintentional release because the first part of the turning movement of the lever 24 must move the pivot 23 clear of the radial line from pivot 20 through the centre of the stud 25 before the cranked link can move the pivot 20 in the direction to break the toggle.

In assembling the mechanism the reinforcing plates 6 are united to the side plates 5 by a number of rivets 34 whose ends are flush both inside and outside. The distance piece 7 is inserted, and then the pivot 16 of the trigger 15, the pivot 21 of the links 18, and the axis or stud 25 of the lever 24 are placed in position between the side plates and these latter are connected together by tubular rivets 35 and 36 whose ends are spun over on assembly. The rivets 8 through the distance piece 7 are also fixed in position at this stage. The tubular rivets 35 and 36 provide a convenient means of attaching the release mechanism to a support by any means of attachment passing through one or both of these tubular rivets.

By adjusting the position of the lug 29 between the plates of the lever 24 the lug can be put in the most convenient relative position depending upon the direction in which a pull is to be applied thereto for releasing purposes.

It will be seen that the claw 9 and the trigger 15 occupy substantially the whole width of the space between the reinforcing plates 6 so that these members may be made very robust. They may be built up if desired of a series of laminae united by rivets or otherwise.

The inter-engaging surfaces of the end 14 of the claw 9 and of the trigger 15 may be inclined slightly as shown to a surface which would be at right angles to a radius from the centre of the pivot 16, in order to facilitate disengagement of the claw under load. The inclining of the engaging surfaces causes some tendency of the trigger 15 to turn in a direction for release, but the trigger is held locked by the toggle mechanism and the cranked link 22 so that there is no fear of unintentional release, as already explained. When the claw is to be re-engaged with the trigger after it has been released therefrom, the lever 24 must be turned so as to draw back the trigger and the claw must be closed into position for en-engagement by the trigger before the lever 24 is allowed to return to its locking position under the action of the springs 26.

I claim:

1. A releasable towing and suspending appliance comprising side plates, a claw pivoted between said side plates, a trigger also separately pivoted between said side plates, a part of said claw being shaped for engagement with a recess in said trigger, a pair of toggle links with pivotal connecting means between them, one of said toggle links being pivoted to said trigger and the other of said toggle links being pivoted to said side plates, an operating lever, a pivot pin supporting said operating lever upon said side plates, and a further link with means pivotally connecting it near one end with said operating lever, the other end of said further link being connected to said pivotal connecting means between said toggle links, said parts being so formed and arranged that when said operating lever is moved into the position for engaging said trigger with said claw, the said toggle links are straightened out and the center of the pivot of said further link upon said operating lever passes over a straight line through the center of the pivot pin of said operating lever and through the center of the pivotal connection between said pair of toggle links.

2. A releasable towing and suspending appliance as claimed by claim 1, wherein said further link extending between the pivotal connecting means of said toggle links and its pivotal connection on said operating lever, is of cranked shape adapted to embrace the pivot pin of said operating lever when moved into the position for engaging said trigger with said claw, the cranked portion of said further link constituting a stop determining the extent of movement of said operating lever in the engaging direction.

3. A releasable towing and suspending appliance as claimed by claim 1, further comprising a pair of springs embracing the pivot pin of said operating lever, one end of each such spring being connected to said operating lever, and the other end of each such spring being anchored to said side plates, said springs acting upon said operating lever in a direction tending to turn it into the position wherein it holds said toggle links straightened and said trigger in engagement with said claw.

4. A releasable towing and suspending appliance as claimed by claim 1, further comprising a pair of reinforcing plates secured to said side plates on their inner faces and supporting the pivots of both said claw and said trigger, means spacing said reinforcing plates apart at such a distance that said claw and said trigger may work closely between said reinforcing plates, and spring means tending to turn said operating lever in a direction such as to straighten out said toggle links and hold said trigger in engagement with said claw.

5. A releasable towing and suspending appliance as claimed by claim 1 wherein said claw is curved to provide a surface for engagement by an element to be suspended or towed, and beyond said curved portion said claw terminates in a projecting portion adapted for direct engagement in the recess in said trigger, the engaging surfaces between said claw and said trigger being inclined in a plane extending to one side of the plane through the center of the pivot of said claw between said side plates whereby disengagement of said claw by said trigger when under load is facilitated.

MARCEL JULES ODILON LOBELLE.